E. LISHERNESS & D. A. SARGENT.
DEVICE FOR REMOVING BARK FROM LOGS, LIMBS OF TREES, AND SLABS.
APPLICATION FILED NOV. 3, 1913.
1,087,959.
Patented Feb. 24, 1914.
2 SHEETS—SHEET 1.
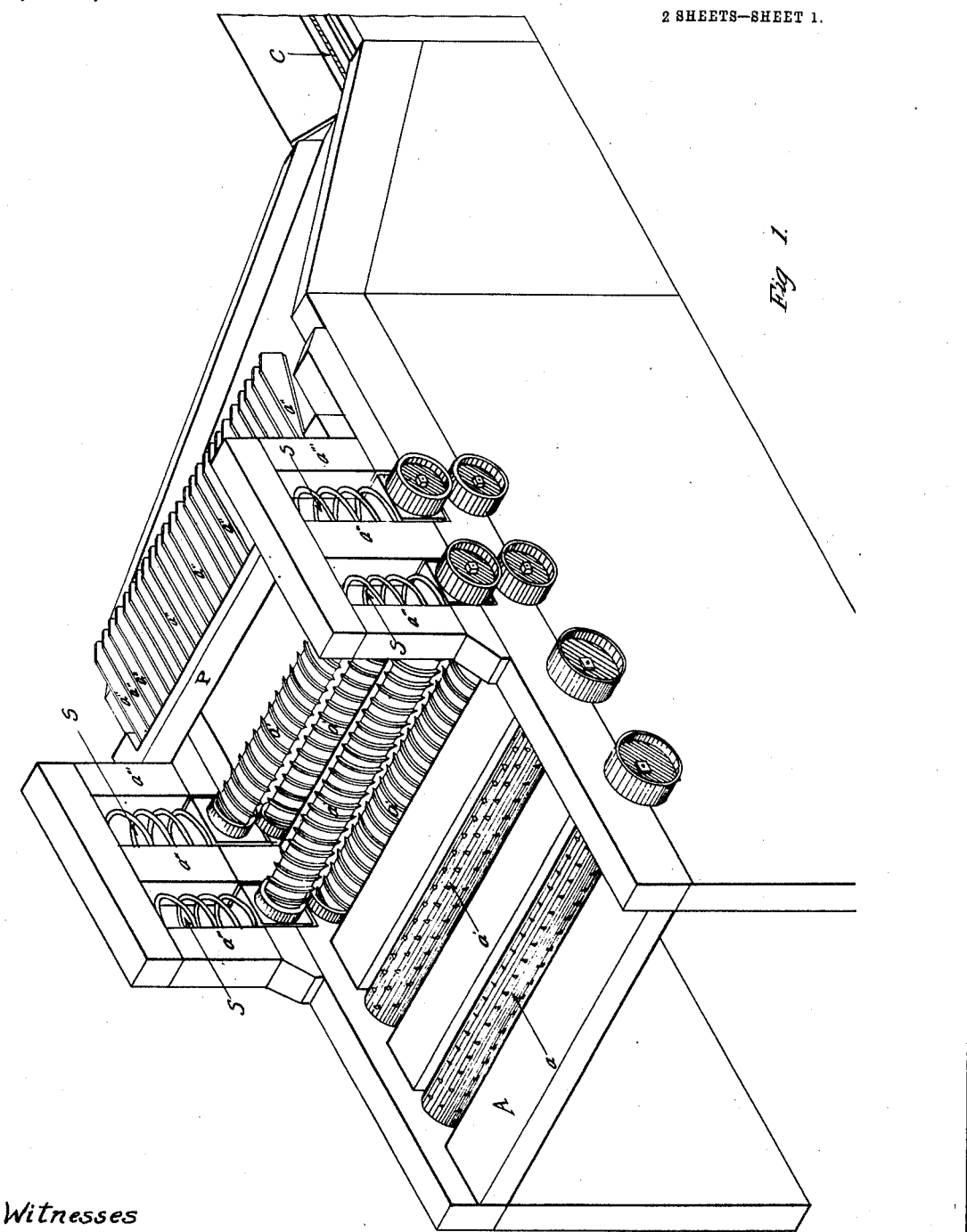
Witnesses
Inventors.

E. LISHERNESS & D. A. SARGENT.
DEVICE FOR REMOVING BARK FROM LOGS, LIMBS OF TREES, AND SLABS.
APPLICATION FILED NOV. 3, 1913.
1,087,959.
Patented Feb. 24, 1914.
2 SHEETS—SHEET 2.
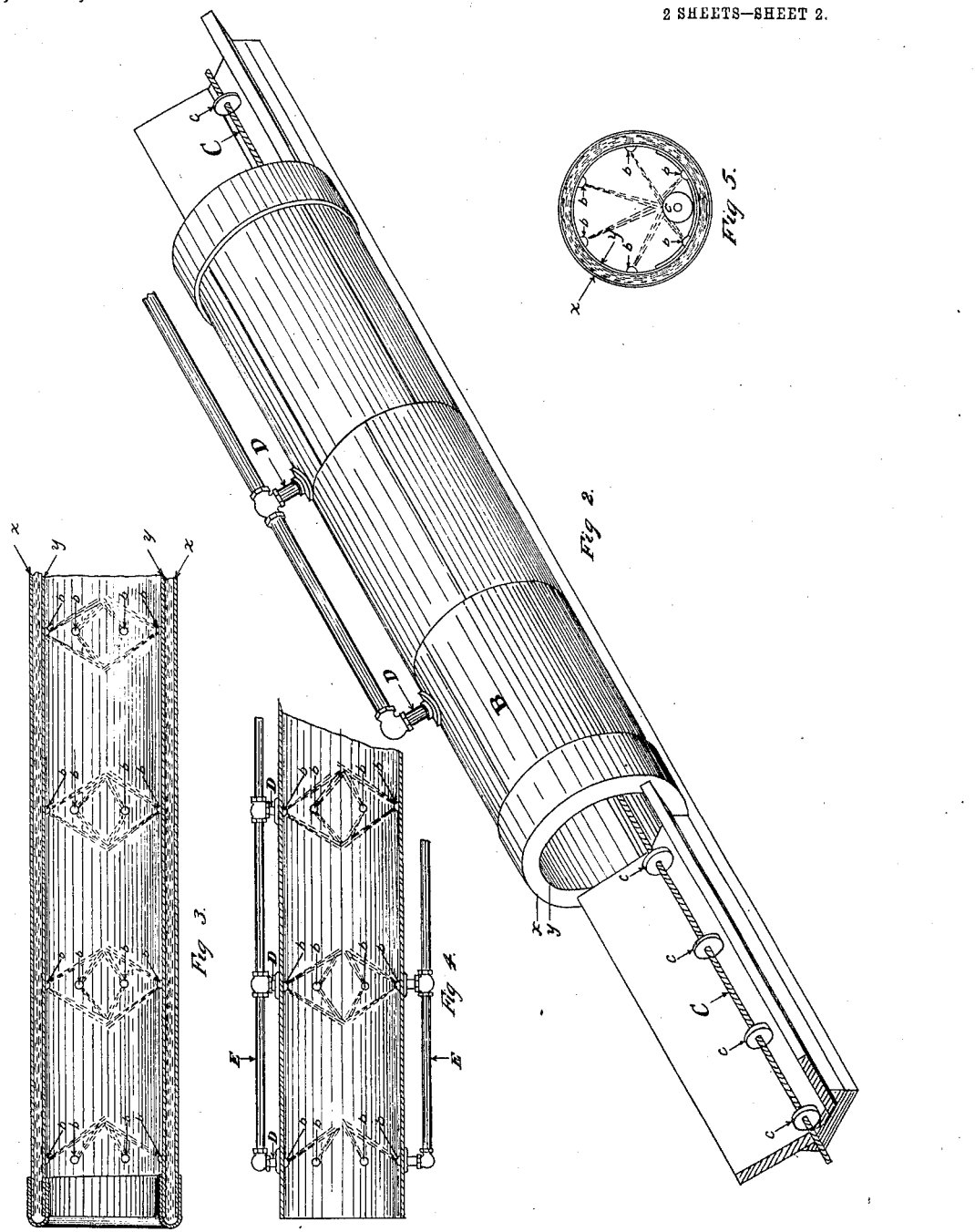

UNITED STATES PATENT OFFICE.

ERNEST LISHERNESS, OF HAMPDEN, MAINE, AND DONALD A. SARGENT, OF BRIDGEPORT, CONNECTICUT.

DEVICE FOR REMOVING BARK FROM LOGS, LIMBS OF TREES, AND SLABS.

1,087,959. Specification of Letters Patent. Patented Feb. 24, 1914.

Application filed November 3, 1913. Serial No. 798,892.

*To all whom it may concern:*

Be it known that we, ERNEST LISHERNESS and DONALD A. SARGENT, citizens of the United States, and residents, respectively, of Hampden, in the county of Penobscot and State of Maine, and Bridgeport, in the county of Fairfield and State of Connecticut, have invented certain new and useful Improvements in Devices for Removing Bark from Logs, Limbs of Trees, and Slabs, of which the following is a specification.

Our invention consists of a device for removing bark from logs, limbs of trees and slabs, and is fully illustrated in the accompanying drawings in which—

Figure 1, is an isometric view of table, rolls and knives. Fig. 2, is an isometric view of dissolving tube with carrier. Fig. 3, is a longitudinal section of tube showing annular chamber and entering jets. Fig. 4, is a longitudinal section of tube without annular chamber. Fig. 5, is a cross section of tube.

Similar letters refer to corresponding parts throughout the figures.

The purpose of our device is to provide a rapid, efficient and economical device for removing the bark from the round log, limbs of trees, and slabs, thus leaving the wood fit for the manufacture of pulp in which the admixture of bark spoils the product.

The device consists of two principal parts shown separately for convenience in Figs. 1 and 2, though in operation the two parts form a continuous whole.

The part of the machine shown in Fig. 1, consists of a heavily framed table A fitted with toothed dog-rolls $a$, cutting rolls $a'$ and drag knives $a''$ in the order named. The cutting rolls $a'$ are formed of cylinders surrounded with spiral cutting edges as shown for making diagonal cuts, and arranged in pairs, one of the pair being above the other, the lower pair turning in stationary bearings and the upper pair in bearings arranged for movement up and down in guides $a'''$ to admit of the passage of logs or material of different diameters under downward pressure of the springs S. The drag-knives $a''$ are spring hinged or hung in a cross piece P of the frame.

The part shown in Fig. 2, consists of a dissolving tube B preferably cylindrical in shape, and consisting of two cylinders $x$, $y$, of different diameters—one within the other—forming an annular chamber between the inner surface of the larger $x$, and the outer surface of the smaller $y$. Water at a temperature of from 150° to 212° is forced into this chamber at convenient points as at D under heavy pressure, (150 or more pounds to the square inch) and, through a plurality of vents $b$ in the inner cylinder throughout its length, is projected with great force upon the material within the tube. An endless carrier C fitted with lugs $c$ and traversing the tube longitudinally receives the material from the table A and carries it through the tube.

The dissolving tube may be formed without the outer shell $x$ as shown in Fig. 4, in which case the hot water is introduced directly into the tube through the apertures $b$ from the feed pipe E, but with the two cylinders $x$ and $y$ and the annular chamber the heat is conserved and the result obtained is more satisfactory.

The dog-rolls, cutting rolls and carrier are all operated by power and one pair only of the cutting rolls is absolutely necessary though two or more pair are desirable. The spiral cutting edge upon the cutting roll turns to the right hand upon one of each pair and to the left upon the other so that they make transverse intersecting cuts upon the bark while the drag-knives slash longitudinally thus very completely scarifying it.

In operation the material to be stripped of bark is placed upon the table A, carried forward by the dog rolls $a$, passes between the upper and lower cutting rolls $a'$ where the bark is scarified by diagonally intersecting right and left cuts; thence on to the drag-knives $a''$ where it is longitudinally slashed; thence into and through the dissolving tube B, through which it is borne by the carrier C and on its passage is subjected to the action of a plurality of jets of hot water under heavy pressure, the friction occasioned by rubbing against other pieces of material and walls of the tube, and the blows of the lugs upon the carrier. Simultaneously the action of the heat and moisture furnished by the hot water softens and dissolves the adhesive matter which unites the bark to the wood and permits its mechanical separation therefrom by the agencies above stated, viz: friction of the pieces of material against each other and the walls of the tube, the blows of the lugs of the carrier, and the impact of the pressure jets, all acting upon the thoroughly scarified bark and the already softened and dissolved adhesive matter between the bark and the wood. The logs or other material then emerge from the tube for the most part denuded of its bark and ready for the manufacture of pulp.

A principal feature of our device is the introduction of the hot pressure jets which striking the material from all sides perform the chief part in ripping off the bark.

Having thus described our invention, we claim and desire to secure by Letters Patent,

1. A device for stripping bark from a log or any part thereof consisting of a table carrying a pair of cutting rolls, one of said rolls being above the other, the lower roll turning in stationary bearings and the upper roll in bearings arranged for upward movement against a spring; a dissolving tube in line with and contiguous to said cutting rolls and having a plurality of apertures for the introduction of hot water jets under pressure; and a carrier traversing said tube longitudinally; said rolls and said carrier being operated by power.

2. A device for stripping bark from a log or any part thereof consisting of a table carrying a pair of rolls, one above the other, having upon their surfaces spiral cutting edges, the cutting edge of one roll being oppositely inclined to that of the other roll, the lower roll turning in stationary bearings and the upper roll in bearings arranged for upward movement against a spring; a dissolving tube in line with and contiguous to said cutting rolls and having a plurality of apertures for the introduction of hot water jets under pressure; and a carrier formed with a plurality of projecting lugs and traversing said tube longitudinally; said rolls and said carrier being operated by power.

3. A device for stripping bark from a log or any part thereof consisting of a table carrying a pair of rolls, one above the other, having upon their surfaces spiral cutting edges, the cutting edge of one roll being oppositely inclined to that of the other roll, the lower roll turning in stationary bearings and the upper roll in bearings arranged for upward movement against a spring; a battery of drag-knives between the cutting rolls and the dissolving tube; a dissolving tube in line with and contiguous to said cutting rolls and having a plurality of apertures for the introduction of hot water jets under pressure; and a carrier formed with a plurality of projecting lugs and traversing said tube longitudinally; said rolls and said carrier being operated by power.

ERNEST LISHERNESS.
DONALD A. SARGENT.

Witnesses:
LAWRENCE C. JONES,
ISABEL SHEEHAN.